Patented Sept. 12, 1950

2,522,034

UNITED STATES PATENT OFFICE 2,522,034

1-HYDROXY-8-ACYLAMINO ANTHRAQUINONE DYESTUFFS

Paul Grossmann, Binningen, and Walter Kern, Sissach, Switzerland, assignors to Ciba Limited, Basel, Switzerland, a Swiss firm No Drawing. Application July 29, 1947, Serial No. 764,596. In Switzerland August 7, 1946

11 Claims. (Cl. 8—40)

According to this invention valuable dyestuffs of the anthraquinone series are made by treating a mono-hydroxy-mono-aminoanthraquinone, of which the hydroxyl group is in the 1-position and the amino group in the 8-position, with an acylating agent which is capable of introducing the residue of an aliphatic monocarboxylic acid.

As mono-hydroxy-mono-aminoanthraquinones there may be used in the invention more especially those which in other respects are free from groups imparting solubility. They may, if desired, contain further substituents. It is of advantage, however, to use starting materials which contain no substituents in addition to a hydroxyl and an amino group in the specified positions. There may be mentioned especially 1-hydroxy-8-aminoanthraquinone.

The acylating agents used in the invention may be, more especially, those which yield the residue of an aliphatic monocarboxylic acid of low molecular weight, for example, valeric acid, butyric acid and especially propionic acid or acetic acid. On the other hand, there may be used acylating agents which are capable of introducing a residue of high molecular weight, for example, the residue of caproic acid, caprylic acid, lauric acid or especially palmitic acid, stearic acid or oleic acid. The said aliphatic monocarboxylic acids may contain a straight or branched chain and also non-ionogenic substituents such as halogen atoms. It is of advantage to use as acylating agents functional derivatives of these acids, for example, their acid chlorides or anhydrides, and so especially acetyl chloride or acetic anhydride.

The reaction may be carried out by methods in themselves known, for example, in an inert medium such as pyridine or another tertiary base, acetone, nitrobenzene, chlorobenzene, etc., or, if desired, in an excess of the acylating agent, which excess acts as a solvent or diluent. The reaction is advantageously conducted at a raised temperature.

The dyestuffs obtained by the present invention can be used, for example, as pigments. The derivatives of carboxylic acids of low molecular weight, especially after being suitably pasted, which operation may be associated with reprecipitation, for example, from sulfuric acid, are suitable for dyeing or printing structures composed of celluluose esters, superpolyamides or superpolyurethanes, and also, if desired, these composed of polyvinyl compounds. They can be used especially for dyeing or printing cellulose acetate artificial silk and nylon. There are obtained, inter alia, dyestuffs which yield powerful and pure yellow tints of good fastness to light. With an increase in the molecular weight of the acyl residue, markedly from about 6 carbon atoms, the affinity towards cellulose acetate artificial silk decreases, and solubility in fats and oils increases, so that the derivatives of carboxylic acids of high molecular weight can be used for dyeing fatty substances of all kinds, powerful and pure yellow tints being likewise obtained.

The following examples illustrate the invention, the parts being by weight unless otherwise stated, and the relationship of parts by weight to parts by volume being the same as that of the kilogram to the litre:

Example 1

31 grams of 1-amino-8-hydroxyanthraquinone are suspended in 200 grams of pyridine. 25 grams of acetyl chloride are added, whereupon the mixture becomes spontaneously heated to a temperature of about 60° C. The whole is stirred for one hour to complete the acetylation, then 200 cc. of methyl alcohol are added, and the whole is allowed to cool and then filtered. The dyestuff of the formula

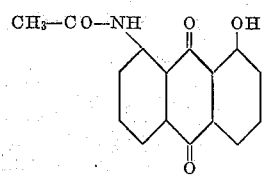

is washed with a small quantity of methyl alcohol and dried. Fine yellow crystals are obtained, which, after being suitably pasted, dye cellulose acetate artificial silk powerful yellow tints which are fast to light.

Example 2

31 grams of 1-amino-8-hydroxyanthraquinone are heated to the boil in 120 grams of acetic anhydride. The whole is boiled for ¼ hour, then allowed to cool, and the yellow crystals so formed are separated by filtration. The dyestuff is practically identical with that obtained as described in Example 1.

Example 3

12 parts of 1-amino-8-hydroxyanthraquinone in 60 parts of monochlorobenzene and 6.6 parts of dimethyl-aniline are mixed at 120° C. with 6 parts of butyryl chloride, and the whole is stirred at 120° C. for about ½ hour. After cooling, the dyestuff of the formula

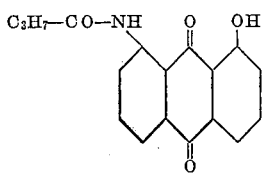

is separated by filtration. After being suitably pasted it dyes cellulose acetate artificial silk fast pure yellow tints.

By using, instead of 6 parts of butyryl chloride, 7.4 parts of caproic acid chloride, 9 parts of caprylic acid chloride, 12 parts of lauric acid chloride, 16.6 parts of stearic acid chloride or 16.6 parts of oleic acid chloride, there are obtained the corresponding acyl compounds of these fatty acids. In order to separate the compounds it is often of advantage to add 60 to 100 parts of methanol. The dyestuffs so obtained are suitable for dyeing fats and oils.

*Example 4*

2.2 parts of propionic acid are heated for two hours at 70° C. in 30 parts of ortho-dichlorobenzene and 3.6 parts of thionyl chloride, the temperature is then increased to 120° C., and 6.6 parts of dimethylaniline and 6 parts of 1-amino-8-hydroxyanthraquinone are added. After about ½ hour the dyestuff is isolated in the manner described in Example 3. It dyes cellulose acetate artificial silk pure yellow tints. Instead of propionic the equivalent amount of chloracetic acid, crotonic acid, valeric acid, isobutyric acid or the like, may be used. When chloracetic acid is employed, the dyestuff of the formula

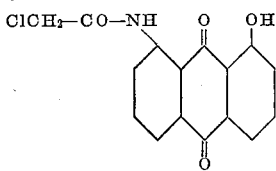

is obtained.

Instead of acetyl chloride, there may be caused to react the chloride of another fatty acid whereby the corresponding acyl derivative is obtained.

*Example 5*

0.5 part of the dyestuff obtained as described in Example 1 or 2 is dissolved in 10 parts by volume of concentrated sulfuric acid, and the whole is poured on to a mixture of ice and water and filtered. The filter cake so obtained is ground with 1 part of dried sulfite cellulose waste liquor and 10 parts of water in a ball mill until a uniform, fine suspension is obtained. The suspension is added to a dye-bath containing 9 parts of soap in 3000 parts of water, 100 parts of well wetted cellulose acetate artificial silk are entered at 40° C., the temperature is raised to 80° C., and dyeing is carried on for one hour at 80–85° C. The cellulose acetate artificial silk is dyed yellow tints which are fast to light.

What we claim is:

1. A dyestuff of the general formula

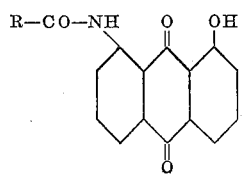

wherein R stands for a radical selected from the group consisting of acyclic aliphatic hydrocarbon radicals and halogen-substituted acyclic aliphatic hydrocarbon radicals.

2. A dyestuff of the general formula

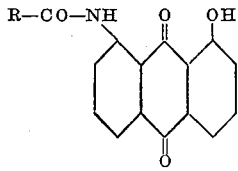

wherein R stands for an acyclic aliphatic hydrocarbon radical containing at most 4 carbon atoms.

3. A dyestuff of the formula

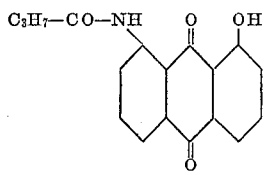

4. A dyestuff of the formula

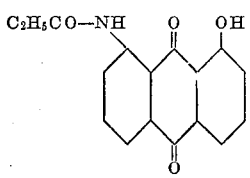

5. A dyestuff of the formula

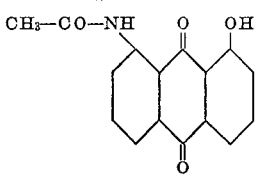

6. A dyestuff preparation for dyeing and printing cellulose acetate and related fibers comprising an intimate mixture of a dispersing agent and a finely dispersed dyestuff according to claim 2.

7. A dyestuff preparation for dyeing and printing cellulose acetate and related fibers comprising an intimate mixture of a dispersing agent and a finely dispersed dyestuff according to claim 3.

8. A dyestuff preparation for dyeing and printing cellulose acetate and related fibers comprising an intimate mixture of a dispersing agent and a finely dispersed dyestuff according to claim 4.

9. A dyestuff preparation for dyeing and printing cellulose acetate and related fibers comprising an intimate mixture of a dispersing agent and a finely dispersed dyestuff according to claim 5.

10. A dyestuff of the formula

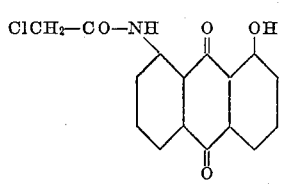

11. A dyestuff preparation for dyeing and printing cellulose acetate and related fibers comprising an intimate mixture of a dispersing agent and a finely dispersed dyestuff according to claim 10.

PAUL GROSSMANN.
WALTER KERN.

REFERENCES CITED

The following references are of record in the file of this patent:

UNITED STATES PATENTS

| Number | Name | Date |
| --- | --- | --- |
| 1,871,821 | Nawiasky et al. | Aug. 16, 1932 |
| 2,137,295 | Koeberle | Nov. 22, 1938 |
| 2,294,968 | Ellis et al. | Sept. 8, 1942 |
| 2,381,971 | Dreyfus | Aug. 14, 1945 |
| 2,383,236 | Buckley et al. | Aug. 21, 1945 |

FOREIGN PATENTS

| Number | Country | Date |
| --- | --- | --- |
| 148,875 | Germany | Feb. 5, 1904 |
| 211,958 | Germany | July 19, 1909 |
| 213,960 | Germany | Sept. 22, 1909 |
| 290,983 | Germany | Mar. 25, 1916 |
| 290,984 | Germany | Mar. 29, 1916 |